Figure 1:
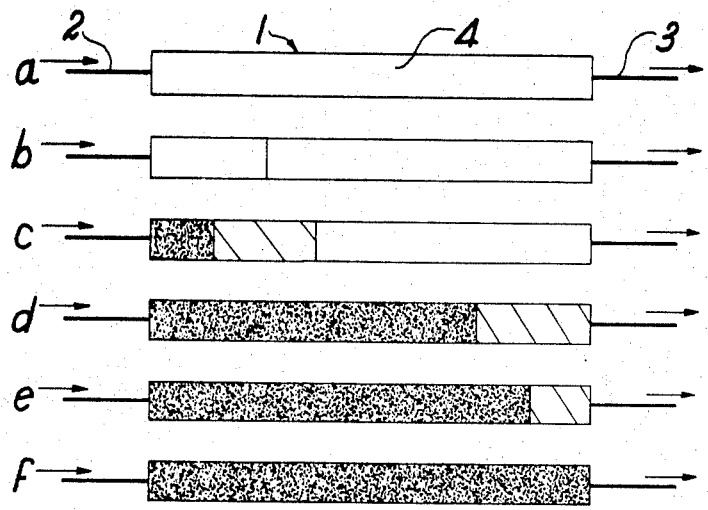

United States Patent
Dirian

[15] 3,698,156
[45] Oct. 17, 1972

[54] METHOD OF CONTINUOUS SEPARATION BY GAS-PHASE CHROMATOGRAPHY ON FIXED GRANULAR REDS

[72] Inventor: Gregoire Dirian, Palaiseau, France

[73] Assignee: Commissariat A L'Energie Atomique, Paris, France

[22] Filed: May 20, 1970

[21] Appl. No.: 39,091

[30] Foreign Application Priority Data

May 22, 1969 France.....................6916709

[52] U.S. Cl..................................................55/67
[51] Int. Cl. ............................................B01d 15/08
[58] Field of Search ............73/23.1; 55/67, 197, 386

[56] References Cited

UNITED STATES PATENTS

| | | | |
|---|---|---|---|
| 3,225,520 | 12/1965 | Burow | 55/197 X |
| 3,225,521 | 12/1965 | Burow | 55/197 X |
| 3,455,090 | 7/1969 | Deford | 55/67 |
| 3,533,220 | 10/1970 | Espagno et al | 55/386 X |

Primary Examiner—Jim L. De Cesare
Attorney—Cameron, Kerkam & Sutton

[57] ABSTRACT

At least four columns filled with granular material are arranged so as to form a circulation loop, each column being intended to perform in cyclic operation successive functions of stripping, enriching, collecting the tail gas which is enriched in the least strongly adsorbed component of a gas mixture and feeding of the tail gas which is enriched in the most strongly adsorbed component. The mixture to be separated is introduced at a point of the pipe which connects the column employed at a given moment as stripping column to the column which serves at the same moment as enriching column. A fraction of the gas which is enriched in the least strongly adsorbed component is recovered at the outlet of the enriching column whilst the other fraction is fed into the following column. The gases which are adsorbed on the granular material are desorbed from the column containing the tail gas. A fraction of the gas which is enriched in the most strongly adsorbed component is withdrawn at the outlet of the column containing the tail gas whilst the other fraction is fed into the column which performs the function of stripping column.

12 Claims, 10 Drawing Figures

METHOD OF CONTINUOUS SEPARATION BY GAS-PHASE CHROMATOGRAPHY ON FIXED GRANULAR REDS

The present invention relates to a process for continuous separation by gas chromatography on fixed granular beds. This process finds a particularly advantageous application in the separation of components of a gas mixture having closely related properties and in the separation of isotopes.

It is known that gas chromatography is a highly effective means of separating substances which have but slightly different properties and which cannot readily be separated economically by other methods such as distillation, for example. The field of application of gas chromatography extends to the separation of substances which are as closely related as isotopic molecules.

When chromatography is employed as a method of either chemical or isotopic enrichment for preparative purposes, that is to say when it is required to produce appreciable quantities of enriched product, recourse is usually had either to chromatography involving displacement of a band through a fixed granular bed or to chromatography on a mobile bed. In the last-mentioned process, the granular substance which is loaded with the mixture to be separated passes downwards through chromatographic column whilst the mixture in the gaseous state passes upwards. An exchange of substance between the gas phase and the phase which is retained by the granular material takes place at all levels of the column. At the bottom of the column, the mixture retained by the granular material is withdrawn and fed back into the column in the upward direction whilst the granular material is recovered. At the top of the column, the exit gas is again adsorbed on fresh granular material which is fed back into the column in the downward direction.

If one of the phases contains a slightly higher percentage of one of the components of the mixture than the other phase in the state of equilibrium, the counter-current flow which is thus established results in a multiplication of the elementary separation effect: the gas is highly enriched in one of the components at one end of the column and is highly depleted in the same component at the other end. These enriched and depleted products are collected whilst an equivalent quantity of the mixture to be separated is fed continuously into the column near the point at which the composition of the gas is substantially the same as that of the mixture to be separated.

This method of operation offers the advantage of continuous or practically continuous production. But the most serious shortcoming of the method lies in the fact that the movement of the granular substance causes disturbances which are detrimental to the uniform flow of gas, with the result that the efficiency of the column is of a relatively low order.

With displacement chromatography in which the band is displaced through a fixed bed, it is known that, on the contrary, very high column efficiencies can be obtained. On the other hand, in the form in which it is usually carried out, this method is essentially discontinuous. This disadvantage is of minor importance in the case of small-quantity production but becomes serious when the method has to be applied to production on a fairly large scale.

Although displacement chromatography involving passage of the band through a fixed granular bed is a well known technique, it will prove useful to recall the usual method of operation in order that the scope which is offered by the present invention may be more readily appreciated.

FIG. 1 is a diagrammatic presentation of this technique. A column 1 provided with an admission pipe 2 and an extraction pipe 3 is filled with a granular substance 4 which is capable of retaining a certain quantity of the gas mixture to be separated. At the outset, the column contains a gas which is inert with respect to the granular substance, that is to say which is not retained or retained only to a very slight extent by said substance (position $a$ of FIG. 1). There is then introduced through the pipe 2 a predetermined quantity of the gas mixture to be separated. A certain quantity of the interstitial inert gas is driven in front of said mixture, passes out through the pipe 3 and is partially adsorbed on the granular material in the cross-hatched zone of FIG. 1 (position $b$), thus forming what is usually referred-to as a band. A so-called "displacing" gas is then admitted through the pipe 2. This gas has the property of being much more strongly adsorbed on the granular material than the mixture to be separated; said mixture is therefore extracted from the granular material by the displacing gas and moved forward by this latter. This fraction which is extracted at the rear of the band travels along said band and gives rise to an exchange of substance with the gas mixture which is retained by the granular material and is adsorbed on this latter at the front of the band. By maintaining a constant length, the band consequently moves along the column (position $c$ of FIG. 1) while the interstitial inert gas leaves the column progressively through the pipe 3 and the displacing gas fills the column (as shown in black in FIG. 1). It can readily be seen that, within the interior of the band and at the end of a sufficient path length, the mode of operation is the same as in the mobile-bed chromatographic process described above, the only difference being that the band moves with respect to the walls of the column 1 whereas the granular material remains stationary. And it is the very fact of its being stationary which ensures high separating efficiency. In consequence, the front of the band is highly enriched in one of the components of the mixture to be separated whereas the rear of the band is highly depleted in said component. When the band has reached the end of the column (position $d$ in FIG. 1), any additional introduction of displacing gas through the pipe 2 results in discharge through the pipe 3 of an equivalent quantity of the mixture to be separated. There is thus first collected a highly enriched mixture followed by a mixture which is progressively more depleted (position $e$ of FIG. 1) and finally a mixture which is highly depleted in one of the components when the band has practically disappeared from the column (position $f$ of FIG. 1).

At this stage, the column is saturated with the displacing gas. In order to begin a further operating cycle, it is necessary to regenerate the column, that is to say to cause the displacing gas which has been retained therein to be removed by any suitable means (heating and/or prolonged sweeping with an inert gas, for example) in order to restore the column to position $a$ of FIG. 1.

The choice of the granular substance, of the inert gas and of the displacing gas as well as the mode of regeneration will vary in each particular case which is contemplated. In some cases, when the sole aim to be achieved is the production of the mixture which is enriched in the component at the front of the band, the displacing gas can simply be the other component if an abundant supply of this latter is available. This sometimes arises, for example, in the case of enrichment of deuterium or tritium from the mixtures of these latter with protium. In that case, the displacing gas can be hydrogen having a natural isotopic abundance.

It is apparent that a substantial length of column is reserved for this process whereas the portion of column which is useful for the separation at any given moment is limited to the length of the band.

Figure 2:
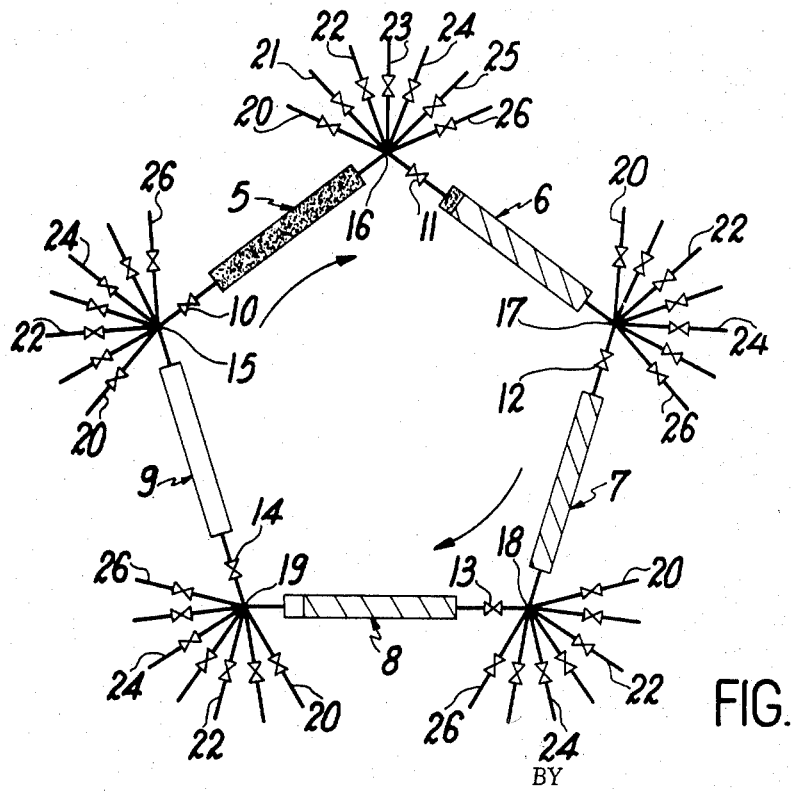

It has been proposed to overcome this disadvantage by subdividing the column into two or more columns in accordance with the diagram of FIG. 2, in which five columns are shown. In this manner, it is possible to regenerate one column as soon as the band has left this latter and to make immediate use of this column in order to receive the front of the band which continues its displacement. It is thus clear that each column undergoes an operating cycle during which it contains successively inert gas, then gas to be separated, then displacing gas and so on in sequence. For the sake of simplicity, the columns are accordingly shown in FIG. 2 as being disposed in a circle and the direction of circulation of the gases is represented by an arrow. As in FIG. 1, that section or element of the columns which contains inert gas is shown in white, the element containing the mixture to be separated is represented by cross-hatched zones, the element containing the displacing gas is shown in black. The pipes for the admission of gases into the respective columns 10, 11, 12, 13 and 14 are each fitted with a valve. The discharge pipes 15, 16, 17, 18 and 19 are not necessarily fitted with valves.

The advantage of an arrangement of this type lies in the fact that the passage of the entire band successively at the five points of interconnection of the columns is turned to useful account in order to carry out at each of these points the operations which are necessary for production, namely:

introduction of the mixture to be separated at a point of the band which has a closely related composition, extraction of the enriched product at the front of the band, extraction of the depleted product at the rear of the band.

These introduction and extraction operations are carried out more progressively than is the case when only a single column is employed. In the example shown diagrammatically in FIG. 2 in which the band occupies approximately three columns, feeding and withdrawal will take place three times instead of only once. This has a favorable effect on separating efficiency since product admission or withdrawal is thus carried out each time in a zone whose concentration varies to a lesser extent than in the case of a single column.

In order to carry out these different operations as well as the regeneration of the columns and sweeping with inert gas, it is necessary to ensure that seven pipes which are each fitted with a valve are connected to each pipe junction point 10 and 15, 11 and 16, 12 and 17, 13 and 18, 14 and 19. The seven pipes aforesaid are as follows:

a pipe 20 for the supply of the gas mixture to be separated, a pipe 21 for the withdrawal of enriched gas at the front of the band, a pipe 22 for the withdrawal of depleted gas at the rear of the band, a pipe 23 for supplying displacing gas, a pipe 24 for the removal of displacing gas, a pipe 25 for supplying inert gas, a pipe 26 for the removal of inert gas.

It is apparent that, by means of an arrangement of this type, opening or closure of the appropriate valves makes it possible to carry out all the necessary operations either manually or automatically. But the operation is not strictly continuous in the sense that neither the withdrawals not the supply are carried out uninterruptedly.

Finally, one disadvantage which is common to both modes of operation described in the foregoing and illustrated in FIGS. 1 and 2 lies in the fact that the reconditioning of the columns to make them again ready to receive the front of the band is an operation which entails a large number of idle periods as a result of the use of a displacement gas which has to be driven out before inert gas can again be admitted into the column.

The present invention is directed to a method of separation by gas chromatography on a fixed granular bed as applicable in cases in which the substances to be separated such as isotopically different substances, for example, give rise together with the granular material to a retention equilibrium in which the quantity of substance adsorbed on the granular material is an increasing function of the partial pressure of said substance in the gaseous phase and/or a decreasing function of the temperature. There are many systems which meet these conditions such as those in which the gaseous substances dissolve in the granular material or in a liquid phase which is retained by said material, those in which the gaseous substances enter into chemical reaction with the granular material or with a liquid phase which is retained by said material, those in which the gaseous substances are physically adsorbed on granular material having a large specific surface or alternatively those in which the gaseous substances pass into solution or combine in a solid such as a metal, for example, which is adsorbed on said granular material in a state of sufficient dispersion.

The method according to the invention is distinguished by the fact that the separation process entails the use of at least four columns filled with granular material and arranged so as to form a circulation loop, each column being intended to perform successively as a result of cyclic changeover the function of a depleting or stripping column, an enriching column, a column for collecting the top gas which is enriched in the least strongly adsorbed component of the mixture and of a column for supplying the tail gas which is enriched in the most strongly adsorbed component of the mixture, that the mixture to be separated is introduced at a point of the pipe which connects the column employed at a given moment as stripping column to the column which serves at the same moment as enriching column, that a fraction of the gas which is enriched in the least strongly adsorbed component is recovered at the outlet of the enriching column whilst the other fraction is fed into the following column; that the gases which are adsorbed on the granular material are desorbed from the column containing the tail gas and that a fraction of the gas which is enriched in the most strongly adsorbed component is withdrawn at the outlet of said column containing the tail gas whilst the other fraction is fed into the column which performs the function of stripping column.

In a first embodiment, the desorption of the gases which are adsorbed on the solid is obtained by heating the column which contains the tail gas. In a second embodiment, the extraction of the gases from the column containing the tail gas is obtained by pumping. Both embodiments may also be adopted at the same time.

The gas issuing from the column which retains the front of the band is fed continuously into a column which contains a regenerated solid, namely the column which has previously contained the rear end of the band and which has been regenerated by withdrawal of the gas.

The method in accordance with the invention does not entail the use either of inert gas or of displacing gas and this offers many advantages (such as withdrawal of the simplified gases, for example).

When only four columns are employed, any one of the columns is used at a given moment as a stripping column and this will be designated as function A in the case of this column; the second column is employed as an enriching column (function B); the third column is employed for the purpose of collecting the top gas which is enriched in one of the components of the mixture (function C) and leaves the preceding column which has the function B; finally, the fourth column is subjected to the desorption process (function D); the gas which is extracted from the last-mentioned column is fed continuously into the first column which has the function A.

The installation can have more than four columns. In this case there will be at any given moment at least two columns which have simultaneously one or a number of the four functions defined in the foregoing. It can be necessary in particular to increase the number of columns when it is desired, for example, to increase the efficiency of enrichment with respect to the efficiency of depletion or conversely. Moreover, an increase in the number of columns ensures higher constancy in the composition of the withdrawn gases. Finally, the use of a greater number of columns can make it possible to provide each column with a smaller length, therefore to reduce the length of columns which have the functions C and D at a given moment and which are not directly used for the separation process and, as a final consequence, to reduce the total length of columns which is necessary to carry out a given separation. On the other hand, an increase in the number of columns is attended by greater complications, with the result that the optimum economic solution must be sought in each particular case.

A better understanding of the invention will be obtained by means of two examples of application which will now be described below.

The first example relates to the extraction of tritium contained in small proportions in a deuterium-tritium mixture. As is generally known, it can prove either necessary or desirable to remove small quantities of tritium which are contained in deuterium, for example when deuterium is intended to be employed in bubble chambers. It is also known that heavy water which is employed in nuclear reactors can be removed from tritium-charged water and/or light water by converting said heavy water to deuterium or by transferring the tritium to a deuterium stream by catalytic exchange and then by subjecting the deuterium to chromatographic fractionation in accordance with the patent application entitled "Improvements to means for purification of heavy water" and to the patent application entitled "Method and device for isotopic purification of heavy water" as filed by the present Applicant respectively on 21st June and 3rd Dec. 1968.

In the example now under consideration, the deuterium-tritium separation is carried out by making profitable use of the isotopic fractionation which takes place at the time of dissolution of the deuterium-tritium mixture in certain metals such as palladium. It is known that in this particular case, said fractionation gives rise to a high separation factor which is, for example, of the order of 1.4 in the vicinity of room temperature; that is to say, when equilibrium is achieved, the percentage of tritium contained in the gas phase is approximately 1.4 times the percentage contained in the mixture which is retained in solution in the palladium. At higher temperatures, the separation factor comes close to 1 and, in addition, the quantity of gas retained by the palladium decreases to a slight extent, so that no advantage is gained by exceeding a temperature of 250°C. It would also be undesirable to reduce the temperature to a value below − 80° C by reason of the difficulty which would then be experienced in extracting the gas from the palladium as will become apparent hereinafter.

In this example, the extraction of the gas mixture from the column which contains the rear end of the band (namely the column which carries out function D) is obtained by pumping.

Figure 3:
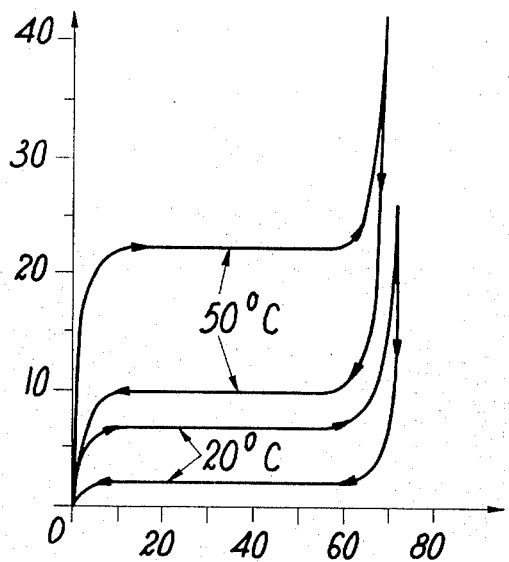

In order that the operating conditions may be more clearly understood, a graph which is well known to those versed in the art is given in FIG. 3 and represents the equilibrium diagram of the palladium-deuterium system. The quantity of deuterium retained (expressed in cm³ under normal conditions) per gram of palladium has been plotted as abscissae and the corresponding pressure in centimeters of mercury has been plotted as ordinates. The different curves, referred-to as isotherms, relate to two different temperatures which are indicated on the graph. There correspond to each of these temperatures two curves which depend on whether the quantity of deuterium adsorbed is increases or decreased as represented by the arrows which appear on the curves. Depending on whether absorption or desorption is taking place, there are two level stages each corresponding to a well-defined pressure in respect of a given temperature. In the case of each of the temperatures considered, the curve exhibits a level stage or plateau corresponding to a well-defined pressure which is greater in value as the temperature is higher. Thus, if the temperature which is chosen by way of example is 50°C, the plateau of the isotherm corresponds to approximately 22 centimeters of mercury if absorption is taking place and to approximately 10 centimeters of mercury if desorption is taking place. If the pressure is higher than 22 centimeters of mercury, the equilibrium corresponds to a high concentration of deuterium in the palladium of the order, for example, of 65 cm$^3$ per gram in respect of a pressure of 30 cm of mercury ; in consequence, the palladium will be loaded with deuterium up to this value. On the contrary, if the pressure is of a low order such as 1 cm of mercury, for example, the equilibrium corresponds to a low deuterium concentration in the palladium, namely less than 1 cm$^3$ per gram. It will therefore be sufficient to remove the deuterium from a column to an extent corresponding to a pressure which is distinctly lower than the pressure of the lower plateau (10 cm of mercury at 50°C) in order to extract from the palladium practically the entire quantity of the deuterium retained. On the contrary, it will only be necessary to feed deuterium into a column under a pressure which is higher than that of the upper plateau (30 cm of mercury at 50°C) in order to ensure that the palladium absorbs large quantities of deuterium.

At a given temperature, the pressures corresponding to the level stages are not the same both for the deuterium and the tritium : the level-pressure stage is slightly higher in the case of tritium. The stages are no longer true plateaus in the case of deuterium-tritium mixtures but are slightly inclined curves. However, it should be clearly emphasized that the method herein described is in no way dependent on the existence of a level-pressure stage or plateau. It is only necessary to ensure that the quantity of deuterium which is retained by the palladium is an increasing function of the pressure. The existence of a plateau, especially if it extends towards the zone of low deuterium concentrations in the palladium, only serves to facilitate the operation by permitting the use of two pressures which are more closely related in value for the purpose of absorption and desorption.

Figure 4:
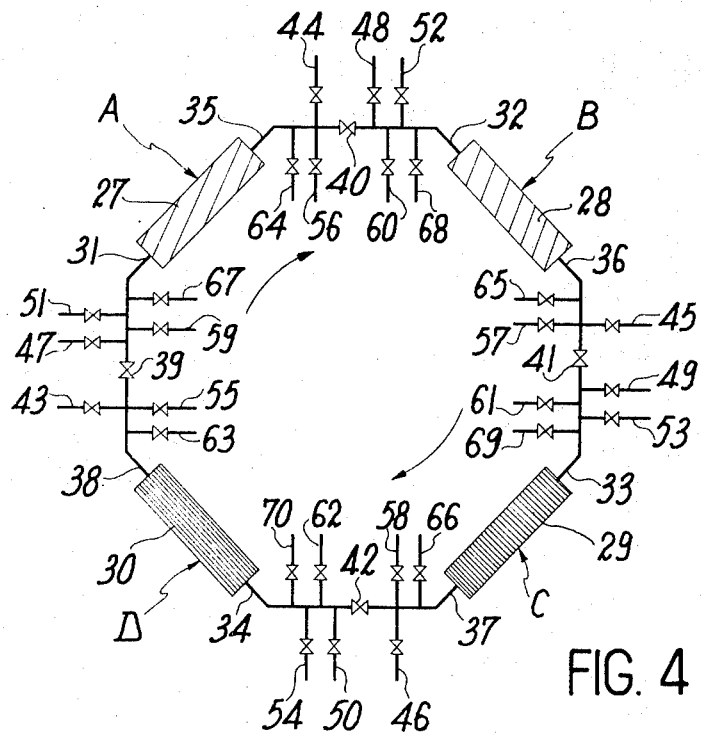

The general layout of the installation is shown diagrammatically in FIG. 4. The installation comprises four columns 27, 28, 29 and 30 each provided with a gas inlet pipe designated respectively by the reference numerals 31, 32, 33 and 34 and with a gas outlet pipe as designated respectively by the reference numerals 35, 36, 37 and 38. These columns are packed with granular material which retains palladium metal. Said columns can be maintained at room temperature, heated to 250°C or on the contrary cooled to − 80°C. A temperature within the range of 0° to 100°C is usually found preferable. The gas outlet pipe of each column is connected to the inlet pipe of the following column by means of a valve (designated respectively by the references 39, 40, 41 or 42), so that the columns are arranged in a circulation loop as shown in FIG. 4 in which the arrows indicate the direction of flow of the gas. There are joined to each of the pipes which serve to interconnect two successive columns seven branch lines which are each fitted with a valve. Provision is therefore made for a total number of 28 branch lines fitted with valves and numbered from 43 to 70, the functions of these lines being defined hereinafter :

43, 44, 45 or 46 : withdrawal of the enriched top fraction, 47, 48, 49 or 50 : introduction of the gas mixture to be fractionated, 51, 52, 53 or 54 : withdrawal of the depleted bottom fraction, 55, 56, 57 or 58 : removal by pumping of the gas from the respective columns 30, 27, 28 or 29 when one of said columns is in the desorption stage (function D), 59, 60, 61 or 62: refluxing of the gases extracted by pumping from the respective columns 30, 27, 28 or 29 towards the respective columns 27, 28, 29 or 30 when one of these columns serves as stripping column (function A), 63, 64, 65 or 66 : discharge of the gases from columns 30, 27, 28 or 29 when one of these columns serves as enriching column (function B), 67, 68, 69 or 70 : feeding of the gases derived from the respective columns 30, 27, 28 or 29 to the respective columns 27, 28, 29 or 30 when one of these columns serves as head column (function C).

In order that the operation of this assembly may be more readily understood, said assembly is shown in FIG. 4 in one of the four possible stages of the cycle in which :

the column 27 serves as stripping column (function A) ; this column is shaded with diagonal lines or cross-hatchings in order to show that it is loaded with gas ;

the column 28 serves as enriching column (function B) ; this column being also loaded with gas and represented by cross-hatchings ;

the column 29 serves as head column (function C) ; having been initially empty, this column is in process of saturation with gas and is represented by transverse hatchings ;

the column 30 serves as tail column (function D) ; this column is in process of desorption and is represented by longitudinal hatchings.

In this stage of the operation, the following eight valves are open : 40, 51, 48, 45, 55, 59, 65 and 69. All the other valves are closed.

In this example, the gas mixture to be separated is deuterium which retains small quantities of tritium to be removed from the deuterium and is fed continuously through the pipe 48 at a substantially constant flow rate.

At the same time and by means of a transfer system which will be described hereinafter, the gas retained by the granular material of column 30 which is a mixture depleted in tritium as will be explained hereinafter is extracted by pumping through the pipe 55 and fed through the pipe 59 at a substantially constant flow rate which is usually appreciably higher than the rate at which the gas mixture to be separated is introduced through the pipe 48. A fraction of the gas which is thus introduced through the pipe 59 is directed towards the column 27 through the pipe 31 whilst another fraction is extracted via the pipe 51 and constitutes the fraction which is depleted in tritium.

Similarly, by means of a second transfer device which will also be described below, a fraction of the gas which leaves the column 28 via the pipe 36 is extracted through the pipe 65 and introduced through the pipe 69 at a substantially constant flow rate which is equal on an average to the flow rate of the gas which flows from the pipe 55 to the pipe 59. The other fraction of the gas which leaves the column 28 through the pipe 36 is extracted through the pipe 45 and constitutes the fraction which is enriched in tritium.

It is thus apparent that this operation may generally be considered as a countercurrent exchange process between the gas phase and the gas components which are retained by the granular material with a top reflux whose function is performed by the column 29, a bottom reflux whose function is performed by the column 30, a feed stream, a withdrawal of enriched product and withdrawal of depleted product. In an exchange process of this type, it is known that the separating efficiency can be calculated approximately by means of the well-known MacCabe-Thiele operating diagrams by virtue of the concept of "height equivalent to a theoretical plate" (HETP). These operating diagrams serve to determine approximately the ratio of the reflux flow rate (mean flow rate of the gas which passes from the pipe 55 to the pipe 59 or from the pipe 65 to the pipe 69) to the feed rate (rate of flow of the gas which is introduced through the pipe 48).

Figure 5:
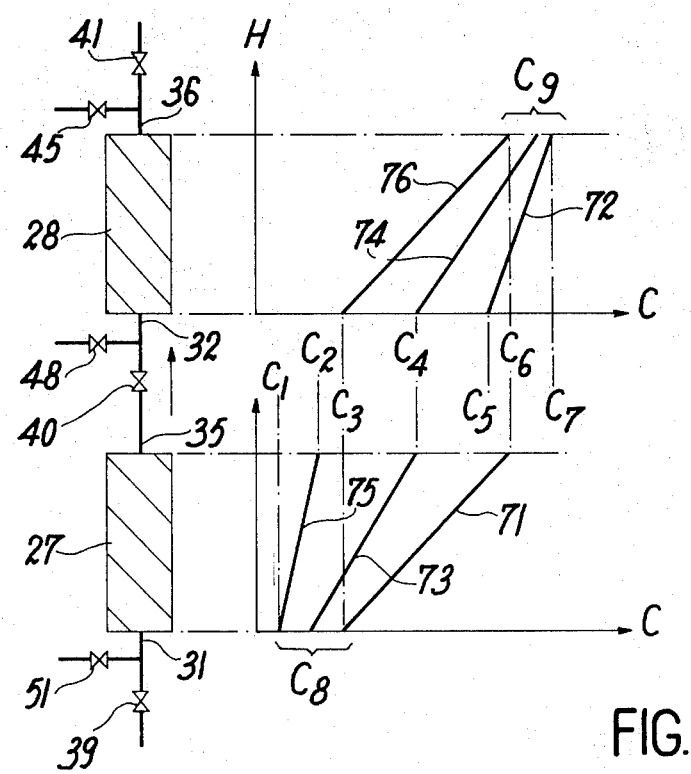

However, contrarily to what occurs in the case of a true countercurrent flow in which the two contacting phases are displaced simultaneously, consideration must be given in this case to the fact that the concentration curve, namely in the present case the curve which gives the concentration of tritium along the column, is not stationary but is deformed and moves in the same direction as the gas at a well-determined speed which is dependent on a number of different parameters and in particular on the gas flow rate. A small portion of the circulation systems comprising in particular the columns 27 and 28 and the line of concentrations within these latter is shown diagrammatically in FIG. 5. The arrow indicates the direction of circulation of the gases. In the graph which corresponds to each column, the height H from the base of the column or column length is plotted as ordinates and the concentration C of tritium in the gas mixture in respect of each column length is plotted as abscissae. For the sake of simplification, the real curves have been replaced by straight-line segments so that only the classification of concentrations corresponding to the end portions of these curves is to be taken into consideration. For enhanced clarity, certain differences between end concentrations have been purposely exaggerated.

At the time of commencement of the operational stage hereinabove described in which the column 27 serves as stripping column and the column 28 serves as enriching column, the curve of concentration in the stripping column 27 is represented by the straight-line segment 71 and the curve of concentration in the enriching column 28 is represented by the straight-line segment 72. The gas which passes from the column 30 into the column 27 via the pipe 31 and a fraction of which is withdrawn as depleted product through the pipe 51 has the composition $C_3$. The gas which leaves the column 28 through the pipe 36 in order to be passed to the column 29 and a fraction of which is withdrawn as enriched product through the pipe 45 has the composition $C_7$. The gas which leaves the column 27 through the pipe 35 has the composition $C_6$. This gas is mixed with the feed gas which is introduced through the pipe 48 and which has the composition $C_4$. The combined gas stream which has an intermediate composition $C_5$ is fed into the column 28 through the pipe 32.

At the end of a predetermined time interval, the concentration curves undergo a progressive displacement and reach position 73 in the case of the column 27 and position 74 in the case of the column 28. At this point, the gas which leaves the column 27 via the pipe 35 has the same composition as the feed gas which is introduced through the pipe 48, with the result that the complete assembly operates under the best conditions of efficiency as is well known in countercurrent fractionation processes. As the progressive displacement of the curves continues, the curve of column 27 reaches position 75 and the curve of column 28 reaches position 76 which is identical with the position 71 corresponding to the position of column 27 at the beginning of the present operational stage. The depleted fraction which is withdrawn through the pipe 51 then has the composition $C_1$ and the enriched fraction which is withdrawn through the pipe 45 has the composition $C_6$.

It is thus clearly seen that, throughout one operational stage, the depleted fraction changes from composition $C_3$ to composition $C_1$ and results on an average in a composition $C_8$ whilst the enriched fraction changes from composition $C_7$ to composition $C_6$ and thus provides on an average a composition $C_9$.

When the concentration curve in column 28 has reached position 76, the column 28 is in exactly the same state as the column 27 at the beginning of the operational stage under consideration in this example. At the same time, if the sum of the quantities withdrawn in the form of depleted fraction via the pipe 51 and of enriched fraction via the pipe 45 has been equal to the quantity of mixture introduced through the pipe 48, the column 29 is accordingly saturated whilst the column 30 is wholly regenerated. The valves are then operated as required for a further operational stage. In this new stage:

the column 28 serves as stripping column (function A),
the column 29 serves as enriching column (function B),
the column 30 serves as head column (function C),
the column 27 serves as tail column (function D).

In this new operational stage, only the following eight valves are opened : 41, 52, 49, 46, 56, 60, 66, 70. The progressive variation or evolution of the system is then exactly the same as in the previous stage. The cyclic operation can thus be repeated indefinitely.

Removal by pumping has been chosen in this example as a mode of desorption of the solid. It is worthy of note that, in practically all the systems in which the quantity of gas retained is a decreasing function of temperature as is shown in the graph of FIG. 3, the absorption of the gas causes evolution of heat whereas the desorption process absorbs heat. This is the case with absorption process of hydrogen or of the hydrogen isotopes by palladium. In consequence, the column which is employed as head column (function C) exhibits a slight temperature rise during the operating cycle described in the foregoing whilst the column employed as tail column (function D) exhibits a slight temperature drop. This effect is correspondingly less pronounced as the heat capacity of the column is greater. In general, the temperature variations do not exceed approximately ten degrees centigrade, with the result that it is unnecessary to maintain the temperatures at a constant value by means of ancillary heating or cooling devices although recourse may be had to these latter if requirements should so dictate. Similarly, the columns can more simply be maintained in a liquid bath having a substantially constant temperature.

In order to ensure good uniformity of operation and high efficiency of the separating columns, it is an advantage as previously stated to ensure that the rates of gas flow through the granular material are substantially constant. It is recommended practice to make use of flow regulating devices for this purpose.

In one of the preferred embodiments of the invention, the different circulations of gas are carried out in the manner which will be described hereinafter. This description relates to that stage of the cycle in which the column 27 serves as a stripping column and column 28 serves as an enriching column as has been illustrated in FIG. 4.

The gas mixture to be separated is fed through the pipe 48 and maintained at a predetermined flow rate of constant value.

The enriched fraction is withdrawn through the pipe 45 either at a predetermined constant flow rate or periodically; in other words, a predetermined quantity of enriched product is withdrawn at a given instant of each stage of the cycle.

The depleted fraction which is withdrawn through the pipe 51 is discharged at a flow rate which is controlled so as to ensure a constant pressure within the pipe 31. To this end, the pipe 51 is provided with a conventional device for allowing the gas to be discharged only when its pressure is higher than a predetermined value. If necessary, this device can be common to the pipes 51, 52, 53 and 54 which are employed successively for the withdrawal of the depleted fraction. It is the choice of the value of this pressure which determines the value of the pressure at the other points of that portion of the circulation system which comprises the columns 27 and 28, taking into account the pressure drops which result from the gas flow. It is apparent that, in this manner, the mean flow rate of the depleted fraction in the steady state is automatically equal to the difference between the flow rate of the feed gas and the mean flow rate of the enriched fraction.

The flow rate of the bottom reflux, that is to say the flow rate of the gas which is extracted through the pipe 55 by pumping of the column 30 and which is partly introduced into the column 27 through the pipe 59 is maintained at a predetermined and substantially constant value, this value being substantially higher than that of the flow rate of the feed gas admitted through the pipe 48 as has been stated earlier. By reason of the fact that an advantage is to be gained by removing the depleted gas from the column 30 as completely as possible since this column is intended to receive enriched gas in the following stage of the cycle and that the flow rate as measured under normal conditions decreases with the suction pressure when pumps of usual types are employed, a buffer reservoir will preferably be introduced so that the rate of reflux is substantially constant in spite of variations in the suction rate above and below the desired mean value. A transfer system of this type is represented diagrammatically in FIG. 6. This system comprises in series a pump 77 fitted with a gas inlet pipe 78 and outlet pipe 79, a buffer reservoir 80 into which the gas is admitted through the pipe 79 and from which the gas emerges through another pipe 83. This system makes it possible to draw the gas from one of the pipes 55, 56, 57 or 58 and to discharge the gas at a constant flow rate respectively into one of the pipes 59, 60, 61 or 62. The eight pipes just referred-to are all fitted with valves. They have been designated by the same reference numerals in FIG. 6 and in FIG. 4.

The top reflux rate, that is to say the flow rate of the gas which leaves the column 28 through the pipe 36 and a part of which enters the column 29 through the pipe 33 is maintained constant and substantially equal to the bottom reflux rate. There can be employed for this purpose a second system which is similar to that described with reference to the bottom reflux but in which the arrangement of the elements is slightly modified in order to take into account the fact that, in this case, the column placed on the delivery side of the pump undergoes substantial pressure variations during the cycle whereas the suction rate must remain substantially constant. A transfer system of this type is shown diagrammatically in FIG. 7. The system comprises in series a flow regulator 84 into which the gas is admitted through the pipe 85 and from which the gas issues through the pipe 86 so as to be directed towards a pump 87. Said gas is delivered by said pump through a pipe 88 to a buffer reservoir 89 and passes out of this latter through a pipe 90. This system makes it possible to deliver into one of the pipes 67, 68, 69 or 70 the gas which is derived respectively from one of the pipes 63, 64, 65 or 66. The pipe 90 can also be provided with a constriction which is not shown in FIG. 7 in order that the gas flow should be limited to a slight extent when the column which is placed on the delivery side is under a very low pressure at the beginning of an operational stage.

Figure 6:
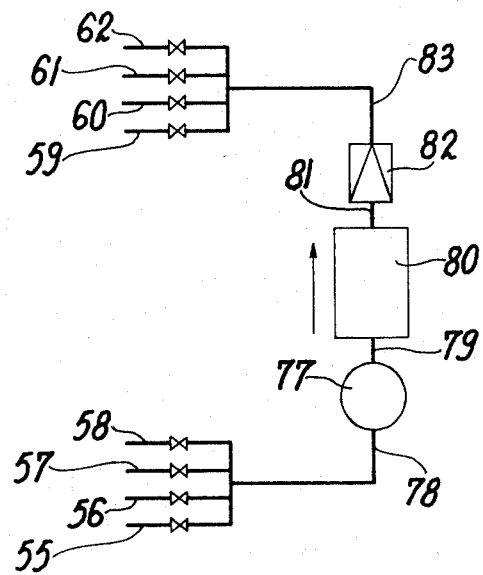
Figure 7:
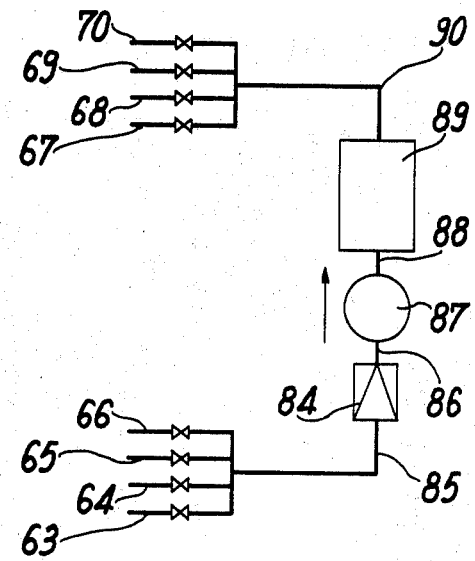

In this second transfer system which is illustrated in FIG. 7, the pump 87 can be of an extremely simple and inexpensive type since it is only required to produce a negative pressure of slightly higher value than that which is necessary for the operation of the flow regulator 84 whereas, in the case of the pump 77 which is shown in FIG. 6, it is always desirable to produce a good vacuum on the suction side.

The transfer systems which are illustrated in FIGS. 6 and 7 and serve to transport continuously the enriched and depleted gases respectively can be turned to account for effecting withdrawals of rich and depleted material through a pipe which is not shown in these two figures. This arrangement has the advantage of dispensing with the eight other pipes which are fitted with valves and employed for this purpose as designated in FIG. 4 by the reference numerals 43, 44, 45, 46, 51, 52, 53 and 54.

It has been mentioned in the foregoing description that the bottom reflux rates and top reflux rates were required to be substantially constant and equal to each other. In fact, slight differences in said rates are not very detrimental to the operation inasmuch as they are compensated automatically by small correlative fluctuations in the rates of withdrawal. This results only in displacements of the isotopic curve in the stripping column and/or in the enriching column, thereby slightly modifying the normal variations in concentrations of the depleted and enriched products respectively about their mean value. However, the separating efficiency of the columns is usually of such a high order that these disturbances are of negligible significance.

A noteworthy advantage of the method as applied to the hydrogen isotopes lies in the fact that the presence of the majority of common gaseous impurities in the mixture to be separated does not have a harmful effect, that is to say apart from the presence of oxygen which can readily be eliminated by combustion and of water vapor which can readily be removed by preliminary drying. Thus, impurities such as nitrogen, carbon dioxide gas, methane, carbon monoxide, the rare gases and so forth are practically not retained by palladium, with the result that they are collected in their entirety as mixed with the enriched fraction which is withdrawn at the head of the columns.

The second example relates to the final enrichment of a product which has been pre-enriched in deuterium by means of another process in an installation for the production of heavy water. In a general manner, it is known that the process employed in the first enrichment step has characteristics such as to permit treatment of high flow rates of material so as to obtain a weakly enriched product having an isotopic content which is comprised, for example, between 1 percent and 10 percent of deuterium. This product is then treated so as to be enriched to a content in the vicinity of 100 percent in a second step by employing the same method or a different method. It is in this second step that the method in accordance with the invention is of particular interest.

In order to provide a clearer illustration of the different alternative forms which can be contemplated, the operation which has been chosen for this example is the enrichment of hydrogen in deuterium by physical adsorption at low temperature on a granular mass such as silica gel, activated carbon, activated alumina, a molecular sieve or any other solid having a high specific surface. It is known, for example, that in the state of equilibrium at $-195°$ C, separation factors of the order of 1.5 are obtained between the species $H_2$ and HD at the time of adsorption on silica gel or on molecular sieves, thereby denoting that the hydrogen retained by the adsorbent contains 1.5 times the number of HD molecules contained in the gas which is present.

In this application, the extraction of the gases from the desorption column (function D) is obtained as a result of a simple temperature rise within said column. In fact, it is known that in the case of molecular sieves and in respect of a pressure of one atmosphere, for example, the quantity of hydrogen retained by the adsorbent is 100 to 200 times smaller at room temperature than at $-196°$ C. It is therefore only necessary to heat a column filled with said absorbent which is loaded with hydrogen under a pressure of one atmosphere in order to desorb the greater part of said hydrogen which can be removed and directed towards a following column. The temperature to be attained is known to be dependent on the nature of the adsorbent, on the mixture to be separated and on its pressure. Conversely, it is only necessary to cool this column in order that the adsorbent should again be loaded with hydrogen derived from the preceding column.

Figure 8:
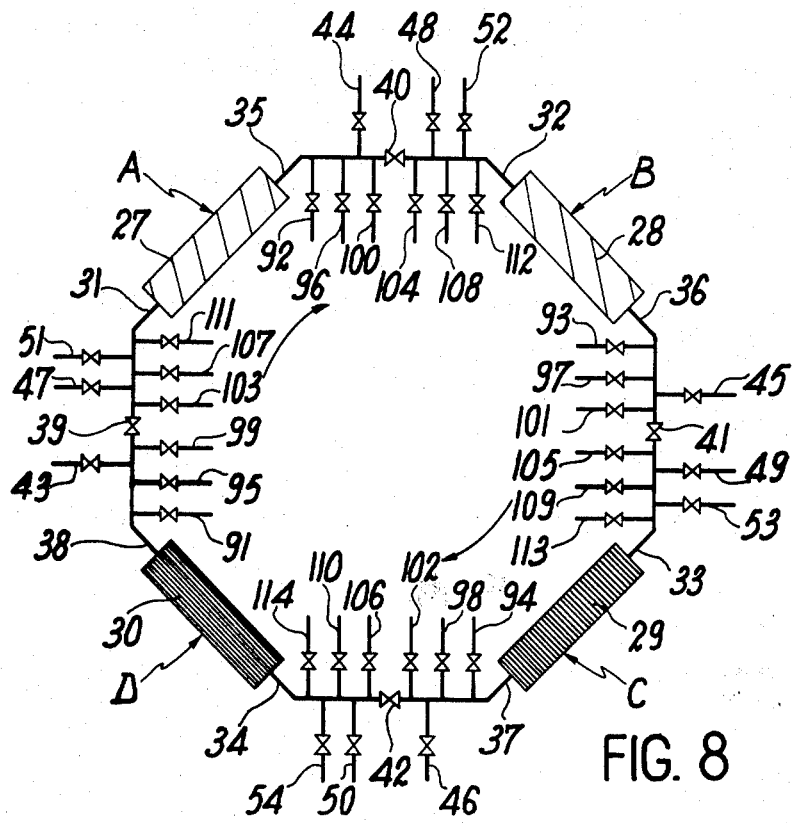

FIG. 8 is a diagrammatic view of the installation for carrying out the method. In this figure, the equipment is represented in the same stage of operations as in FIG. 4. Most of the elements of FIG. 4 again appear in this figure and are designated by the same references in order to ensure a better understanding.

The columns are each packed, for example, with a molecular sieve type 13 X as commonly employed in industry or with any other suitable adsorbent as has been stated above. It will be noted that, by reason of the preferential affinity of these adsorbents for the heavier component of the mixture to be separated (contrarily to the case of adsorption on palladium in which the light component was more readily retained), the enrichment in deuterium takes place in this case at the rear of the band so that the definitions are accordingly reversed. Thus, the column 27 is the enriching column whereas the column 28 is the stripping column. These columns 27 and 28 are maintained at a low temperature between $-195°$ C and $-70°$ C, for example, and operate under a pressure of 0.3 to 3 atmospheres, for example. In FIG. 8, the tail column 30 is in the period of reheating to room temperature or even above this temperature. The head column 29 is in the cooling period.

In the case of small installations, it is convenient for the purpose of cooling or heating the columns to make provision simply for a heating or cooling jacket. However, this solution cannot readily be carried into effect when the columns attain a substantial diameter of the order of 10 cm or more. For this reason, in a preferred embodiment of the invention, heating or cooling of a given column is carried out after said column has been isolated from the remainder of the installation by circulating the gas contained in this column by means of a pump through a heating or cooling element which is located outside the column. Thus, in the stage of the cycle represented in FIG. 8, the column 30 which has the function D is isolated. By means of an ancillary installation which will be described hereinafter, the gas contained in said column is drawn-off through the pipe 91, reheated and fed back into the same column through the pipe 114. This results in progressive desorption of the gas and consequently in a pressure rise whereby the gas which is desorbed from the column 30 and constitutes the bottom reflux is directed partially towards the column 27 via the pipes 103 and 31. On completion of the desorption stage, the pressure remains substantially at its initial value but the greater part of the gas which is adsorbed on the granular material of the column 30 has been extracted and passed to the column 27. Similarly, the column 29 which had been subjected to the desorption process in the preceding stage of the cycle and which now has the function C is isolated and in the hot state. By means of another ancillary installation which will also be described below, the gas of this column is extracted through the pipe 98, cooled and fed back into the same column through the pipe 109. This results in progressive adsorption of the gas and consequently in a pressure drop whereby part of the gas which leaves the column 28 through the pipe 36 and constitutes the top reflux is drawn towards the column 29 via the pipe 101. On completion of the adsorption stage, the pressure remains substantially at its initial value but the granular material of the column 29 is again loaded with gas.

In the installation shown in FIG. 8, there are therefore four times six pipes fitted with valves which distinguish this installation from the assembly shown in FIG. 4 and which have accordingly been provided in FIG. 8 with reference numerals which are different from those given in FIG. 4. These pipes have the following functions:

91 and 114, 92 and 111, 93 and 112, 94 and 113: circulation of the gas with reheating during the desorption step, respectively through the columns 30, 27, 28 and 29, 95 and 110, 96 and 107, 97 and 108, 98 and 109: circulation of the gas with cooling during the adsorption stage, respectively through the columns 30, 27, 28 and 29, 99, 100, 101, 102: pipes for passing the top reflux derived respectively from the columns 29, 30, 27 or 28 to the column which is in process of adsorption, namely respectively 30, 27, 28 and 29, 103, 104, 105, 106: pipes for the removal of the bottom reflux from the column which is in process of desorption, namely respectively 30, 27, 28 and 29, towards the respective columns 27, 28, 29 or 30.

Figure 9:
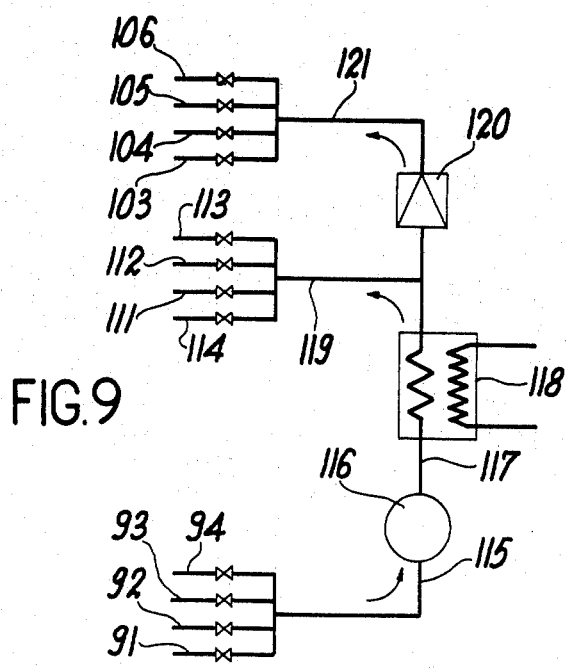

A diagram of the desorption system which serves to establish the bottom reflux is shown in FIG. 9. The gas of the column to be desorbed is drawn through one of the pipes 91, 92, 93 or 94 as the case may be and then through the pipe 115 by means of a pump 116, then passed through the pipe 117 towards a reheating unit 118 and is finally fed back into the same column through the pipe 119 and one of the pipes 114, 111, 112 or 113. As the heating takes place, the desorbed gas issues through a flow regulator 120 and is directed towards the following column through the pipe 121 and one of the pipes 103, 104, 105 or 106.

Figure 10:
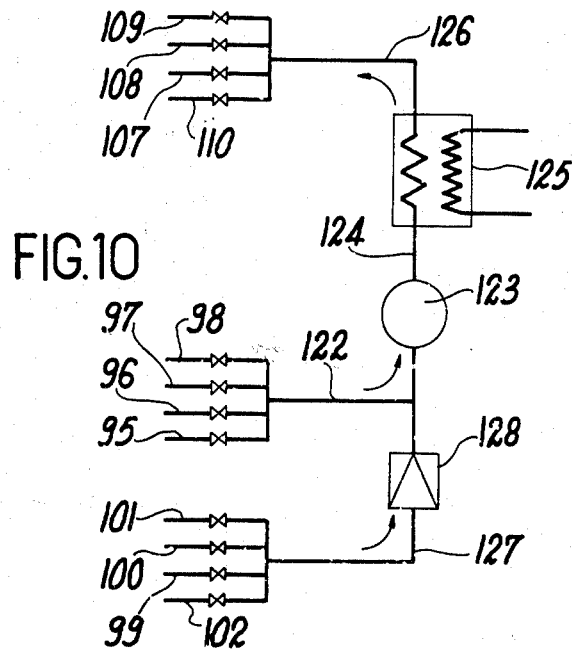

A diagram of the adsorption system which serves to establish the top reflux is shown in FIG. 10. The gas of the column to be re-loaded and which is hot at this moment is drawn through one of the pipes 95, 96, 97 or 98 as the case may be and then through the pipe 122 by means of a pump 123, then directed through the pipe 124 towards a cooling unit 125 and finally fed back into the same column through the pipe 126 and one of the pipes 110, 107, 108 or 109. As the cooling process takes place, the gas is adsorbed on the granular material and produces a negative pressure, with the result that part of the gas of the previous column is admitted into the circulation loop through one of the pipes 102, 99, 100 or 101 and passes through the pipe 127 and the flow regulator 128.

Apart from the means employed for carrying out the adsorption and desorption operations, the operating cycle of the installation is entirely similar to that of example 1, so that it will be unnecessary to give any further detailed description of this cycle. It should simply be noted that, in this example and as has been stated earlier, the enriched product (deuterated hydrogen) is withdrawn from the tail end, which was not the case when a palladium-charged granular substance was employed as absorbent mass. Inert impurities such as nitrogen, oxygen, carbon dioxide gas, water and so forth are also extracted with the bottom fraction in contradistinction to the first example.

It should also be mentioned that, as in the previous example, the pipes 43, 44, 45 and 46 can be dispensed with and replaced by a single pipe which is connected to the top reflux system (not shown in FIG. 10) and the pipes 51, 52, 53 and 54 can be dispensed with and replaced by a single pipe which is connected to the bottom reflux system (not shown in FIG. 9).

In the particular case of the separation of hydrogen isotopes and when fractionation is carried out by means of a physical adsorbent as in this example, enrichment is always limited to 50 percent of deuterium which corresponds to the HD molecule. In order to exceed this value, it is necessary to carry out the balanced reaction:

$$2\,HD \rightleftharpoons H_2 + D_2,$$

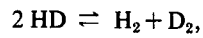

(which does not take place spontaneously), this being effected by the catalytic process as is well known. There can be employed for this purpose an ancillary circulation loop containing an active solid catalyst for this reaction (loop not shown in FIG. 8). Alternatively and more simply, it would be possible to employ within the columns 27, 28, 29 and 30 a granular adsorbent on which a small quantity of a metal or catalytically active compound has previously been deposited (nickel, platinum, palladium or the like) so that the balanced reaction which is written above is carried on progressively as enrichment takes place.

The method in accordance with the invention has been illustrated by means of two examples which relate to the hydrogen isotopes. However, it is to be understood that the method has a much broader scope and that it can be employed for the separation of isotopes of a large number of elements, provided of course that there exists a gaseous compound of this element and that the retention of said compound by a solid granular substance (irrespective of the mechanism of this retention) gives rise to isotopic fractionation. Among the elements which can be enriched by means of this method, mention can be made in particular of hydrogen, boron, uranium, carbon, oxygen, the rare gases, these being given solely by way of example.

The method according to the invention can also be employed for separating the chemical elements or compounds, in particular when these latter have closely related properties and a large number of elementary fractionation processes is necessary in order to obtain an appreciable degree of enrichment.

What we claim is:

1. A method of continuous separation by gas chromatography on a fixed granular bed for the separation of components of a gas mixture having closely related properties and for the separation of isotopes, using at least four columns filled with granular material and connected in a circulation loop, each column successively during a plurality of cycles acting as a stripping column, as an enriching column, as a column for collecting the top gas enriched in the least strongly adsorbed component of the mixture and as a column collecting the tail gas enriched in the most strongly adsorbed component of the mixture, the steps for each cycle of continuously introducing the mixture to be separated at constant volume into a pipe connecting the stripping column to the enriching column, recovering a fraction of the gas enriched in the least strongly adsorbed component at an outlet of the enriching column, feeding the other fraction of the gas into the following column, desorbing the gases adsorbed on the granular material from the column containing the tail gas, withdrawing a fraction of the gas enriched in the most strongly adsorbed component at the outlet of said column containing the tail gas and feeding the other fraction of the gas into the stripping column.

2. A method according to claim 1, the column containing the tail gas being degassed by heating said column.

3. A method according to claim 1, the column containing the tail gas being degassed by heating of the gas circulated through said column prior to admission of said gas into said column.

4. A method according according to claim 1, the column into which the top gas is admitted being re-loaded with gas by cooling said column.

5. A method according to claim 1, the column into which the top gas is admitted being re-loaded by cooling the gas which is circulated through said column prior to admission into said column.

6. A method according to claim 1, including pumping and degassing the column which contains the tail gas.

7. A method according to claim 1, the column into which the top gas is admitted being re-loaded by introduction of gas under reduced pressure.

8. The method according to claim 1 for separation of the isotopes of hydrogen, boron, uranium, carbon, oxygen and rare gases.

9. The method according to claim 1 for the separation of hydrogen isotopes, wherein the granular material on which hydrogen is adsorbed is an inert solid for retaining a quantity of palladium.

10. The method according to claim 1 for the separation of the hydrogen isotopes, wherein the granular material on which hydrogen is adsorbed is a solid having a large specific surface on which the hydrogen is physically adsorbed containing a substance for catalyzing the equilibrium reaction between the isotopic molecules.

11. The method according to claim 1 for an isotopic exchange between heavy water and deuterium and for a conversion of heavy water to deuterium for extraction of tritium-charged and protium-charged elements present in the heavy water.

12. The method according to claim 1 for the final enrichment of heavy water.

* * * * *